UNITED STATES PATENT OFFICE.

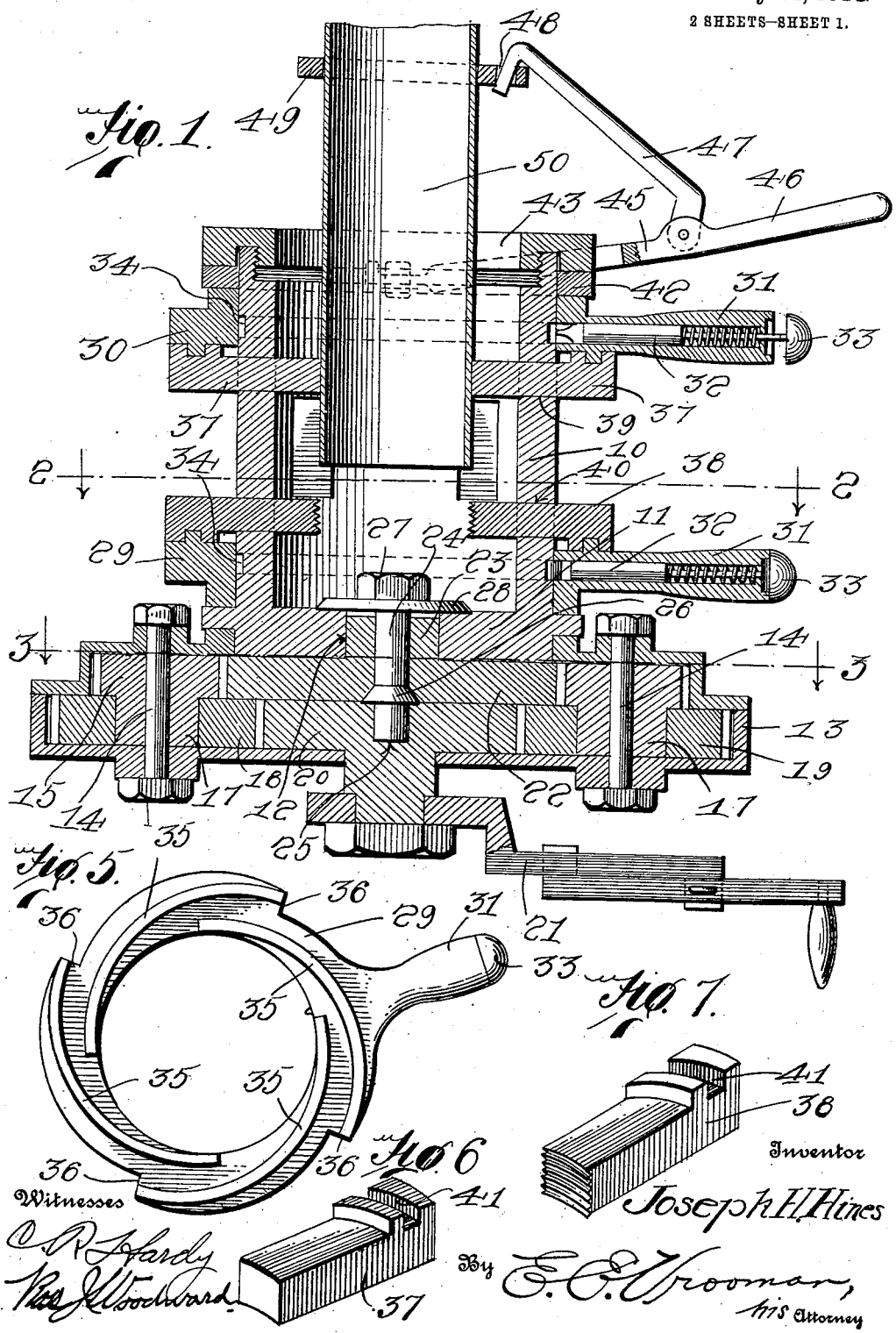

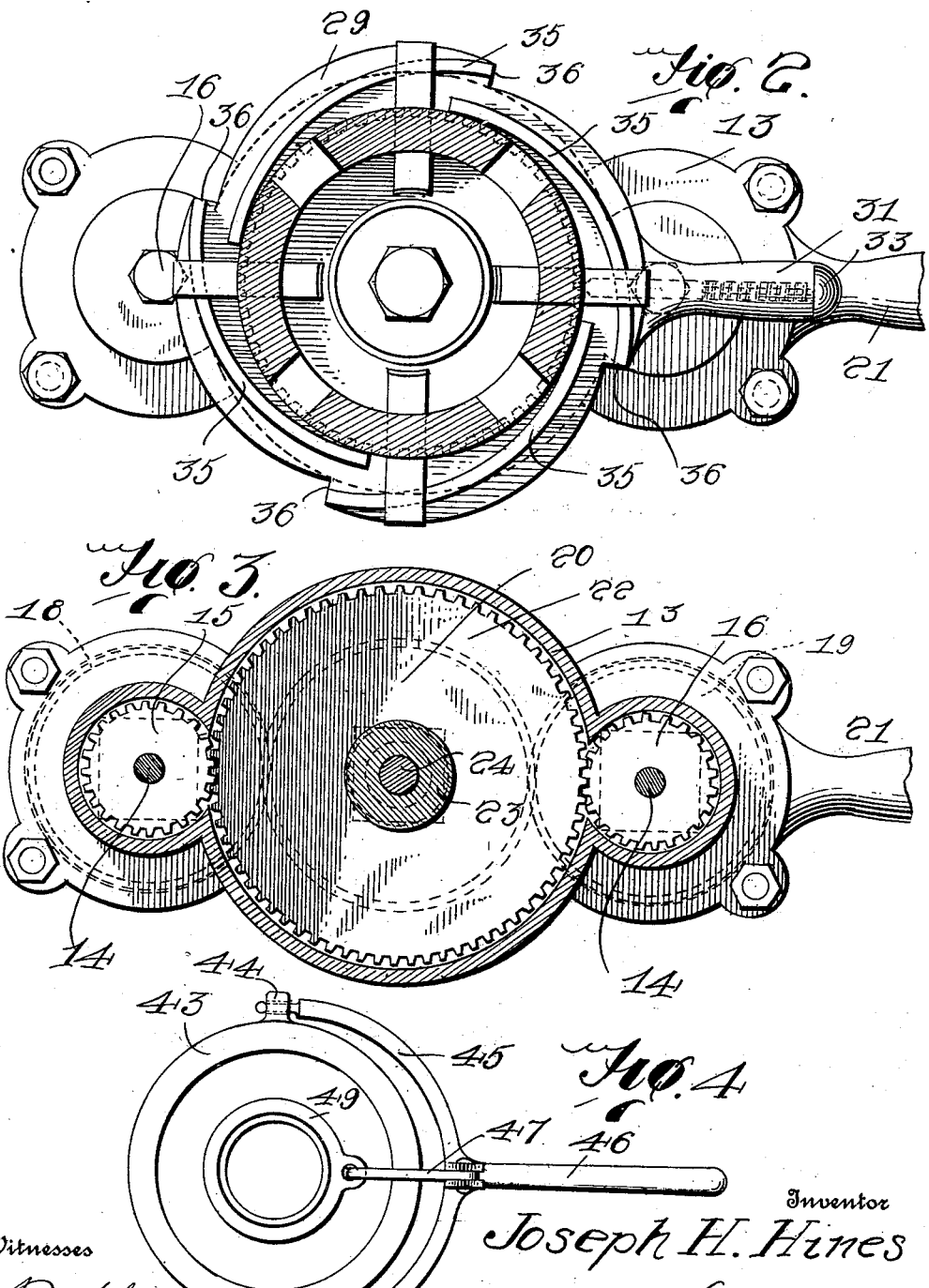

JOSEPH H. HINES, OF PRESCOTT, ARIZONA.

PIPE-THREADING MACHINE.

1,104,046.  Specification of Letters Patent.  Patented July 21, 1914.

Application filed May 7, 1913. Serial No. 766,233.

*To all whom it may concern:*

Be it known that I, JOSEPH H. HINES, citizen of the United States, residing at Prescott, in the county of Yavapai and State of Arizona, have invented certain new and useful Improvements in Pipe-Threading Machines, of which the following is a specification, reference being had therein to the accompanying drawing.

This invention relates to a pipe threading machine and the principal object of the machine is to provide a machine which is simple in construction and which can be easily operated by one person.

Another object of the invention is to provide the machine with an improved operating mechanism so that the machine will rotate upon the pipe which is inserted in the machine.

Another object of the invention is to provide the machine with improved dies and with improved guiding means for the pipe.

With the above and other objects in view this invention consists of certain novel combinations, constructions and arrangements of parts as will be hereinafter fully described and claimed.

In the accompanying drawings:—Figure 1 is a vertical sectional view through the improved thread cutting machine. Fig. 2 is a section taken along the line 2—2, of Fig. 1. Fig. 3 is a section taken along the line 3—3, of Fig. 1. Fig. 4 is an end view looking at the top of the machine. Fig. 5 is a plan view of one of the collars which operates the dies and guides. Fig. 6 is a perspective view of one of the guides. Fig. 7 is a perspective view of one of the dies.

This threading machine is provided with a hub 10 which is provided with a closed end 11 in the center of which there is formed a rectangular opening 12. A housing 13 is provided at the closed end of the hub 10 and is provided with transversely extending bolts 14 which serve as axles for the gear wheels 15 and 16. These gear wheels 15 and 16 are each provided with a square shank 17, and these shanks pass through rectangular openings formed in the centers of the gear wheels 18 and 19. The gear wheels 18 and 19 mesh with the gear wheel 20 and it will thus be seen that when the gear wheel 20 is turned by its handle 21 that rotary motion will be transmitted through the gear wheels 18 and 19 to the gear wheels 15 and 16 and through these gear wheels 15 and 16 to the large gear wheel 22. This gear wheel 22 is mounted in the housing between the gear wheel 20 and the outer face of the head 11 and is provided with a squared extension 23 which extends through the square opening 12, thus causing the hub 10 to be rotated with the large gear wheel 22. It is of course understood that the housing is not rigidly connected with the hub and that, therefore, the hub can rotate without the housing rotating with it. A stem 24 passes through the gear wheel 22 into a socket 25 formed in the gear wheel 20 and is provided with a tapered flange 26 which prevents the stem from being drawn into the hub when the securing nut 27 is tightened. This securing nut engages a washer 28 and the gear wheels 20 and 22 are thus provided with a spindle upon which they may rotate.

Collars 29 and 30 are rotatably mounted upon the hub 10 and are each provided with a handle 31 in which there is mounted a spring plunger 32, the head 33 of which is at the end of the handle 31. These plungers 32 engage teeth 34 formed upon the outer face of the hub so that when the collars 29 and 30 are rotated they may be held in an adjusted position. It is, of course, obvious that the spring plunger must rest as shown at the top of Fig. 1 in order that the collar may be rotated, and that the spring will return it to the position shown at the bottom of Fig. 1 after the collar has been moved to the desired position. These collars are provided with arcuate ribs 35 which extend from the center of the collar to the shoulders 36 and form cam ribs. The guides 37 and dies 38 extend through openings 39 and 40 formed in the hub and are provided with enlarged outer end portions in which there are formed curved grooves 41 through which the cam ribs 35 pass. From an inspection of Figs. 1 and 2 it will be readily seen that when the collars 29 and 30 are rotated that the cams 35 will cause the dies and guides to be moved inwardly or outwardly according to the direction in which the collars are rotated. A ring 42 is rotatably mounted upon the hub above the collar 34 and is rotatably held in place by the collar 43 which is screwed upon the end of the hub. This ring 42 is provided with pivot ears 44 with which the forks 45 of the lever 46 are pivotally connected with a hook 47 which is pivotally connected with the lever 46 and is adapted to engage an eye 48 formed in the clutch ring 49 which is intended to be placed about the pipe 50.

In the operation of this device the ring 49 is first placed upon the pipe and then the end of the pipe which is to be threaded is passed into the open end of the hub between the guides 37. After the pipe has been passed between the guides the handle 31 of the collar 30 is rotated to bring the guides into engagement with the pipe so that the pipe will be guided and prevented from moving out of the vertical position. The hook 47 is then placed within the eye 48 and the lever is then moved to draw the pipe 50 inwardly into engagement with the teeth of the dies 38. As soon as the pipe reaches the dies the handle 31 of the collar 29 is grasped and the collar 29 rotated to cause the dies to cut into the end of the pipe. The handle 21 is then rotated to rotate the gear wheel 20 and transmit rotary motion through the small gear wheels to the large gear wheel 22. As the large gear wheel 22 rotates it will cause the hub to rotate and this will cause the teeth of the dies to cut the threads in the end of the pipe. The threads can be cut to any depth desired by turning the collar 29 to move the dies inwardly as far as desired. The lever 46 is not only used to draw the pipe inwardly so that it can be engaged by the dies, but also prevents the pipe from rotating with the hub. It should be noted that this pipe threading machine can be used for pipes of any size since the dies and guides can be readily adjusted by their collars 29 and 30 so that their inner ends may be moved to accommodate the dies and guides to the size of the pipe.

Having thus described the invention what is claimed as new, is:—

1. A pipe threading machine comprising a hub, a housing carried by said hub and rotatably mounted thereon, gear wheels in said housing, one of said gear wheels being provided with a rectangular extension passing through an opening formed in said hub whereby said hub will rotate with said gears, collars rotatably mounted upon said hub, means for releasably holding said collars in an adjusted position upon said hub, arcuate cam grooves carried by said collars, dies and guides slidably mounted in openings formed in said hub and having their outer ends provided with arcuate grooves through which said cam ribs pass whereby said dies and guides may be moved inwardly and outwardly by turning said collars, pipe engaging means rotatably connected with said hub, and means for rotating said gear wheels.

2. A pipe threading machine comprising a hub, a housing rotatably mounted upon said hub, a gear wheel rotatably mounted in said housing and provided with a spindle extending through said housing, means engaging said spindle for rotating said gear wheel, gear wheels positioned upon opposite sides of said first mentioned gear wheel and meshing with the same, small gear wheels mounted in said housing and provided with rectangular shanks extending through said last mentioned gear wheels whereby the small gear wheels will rotate with the last mentioned gear wheels, a large gear wheel rotatably mounted in said housing and meshing with the smaller gear wheels, a rectangular shank extending from said last mentioned gear wheel and passing through a rectangular opening formed in the head of said hub whereby said hub will rotate with said gear wheels, an axle for said last mentioned gear wheel provided with means at its inner end for engaging the inner face of the head of said hub whereby said housing may be prevented from becoming separated from said hub, pipe guiding means carried by said hub, and thread cutting dies carried by said hub.

3. A pipe threading machine comprising a rotatable hub, thread dies adjustably connected with said rotatable hub, pipe guides adjustably connected with said rotatable hub, a ring rotatably mounted upon said hub, a lever provided with forks pivotally connected with said ring, a hook carried by said lever, and pipe engaging means carried by said hook whereby a pipe may be moved into said hub through said guides and into engagement with said dies by moving said lever upon its pivots.

In testimony whereof I affix my signature in presence of two witnesses.

JOSEPH H. HINES.

Witnesses:
  E. L. BOOTH,
  ELLIOTT B. PETERSON.

Copies of this patent may be obtained for five cents each, by addressing the "Commissioner of Patents, Washington, D. C."